United States Patent [19]

Kumakura

[11] Patent Number: 6,029,016
[45] Date of Patent: *Feb. 22, 2000

[54] CAMERA CAPABLE OF MAGNETIC RECORDING

[75] Inventor: Toshiyuki Kumakura, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/785,988

[22] Filed: Jan. 21, 1997

[30] Foreign Application Priority Data

Jan. 26, 1996 [JP] Japan .................................. 8-011818

[51] Int. Cl.[7] ............................. G03B 17/36; G03B 17/24
[52] U.S. Cl. ............................................ 396/319; 396/390
[58] Field of Search .................................... 396/310, 311, 396/319, 320, 389, 390, 409

[56] References Cited

U.S. PATENT DOCUMENTS

| | | | |
|---|---|---|---|
| 5,453,805 | 9/1995 | Itoh ........................................ | 396/319 |
| 5,479,226 | 12/1995 | Kazami et al. .......................... | 396/319 |
| 5,519,462 | 5/1996 | Spencer et al. ......................... | 396/319 |
| 5,543,872 | 8/1996 | Goto et al. .............................. | 396/319 |
| 5,572,268 | 11/1996 | Tamamura ............................... | 396/319 |
| 5,612,757 | 3/1997 | Amano .................................... | 396/319 |
| 5,614,969 | 3/1997 | Izukawa .................................. | 396/319 |
| 5,617,161 | 4/1997 | Serita et al. ............................. | 396/319 |

*Primary Examiner*—Safet Metjahic
*Assistant Examiner*—Michael Dalakis
*Attorney, Agent, or Firm*—Robin, Blecker & Daley

[57] ABSTRACT

A camera which uses a film cartridge having a magnetic recording part for each frame portion thereof and writes magnetic information in the magnetic recording part of each frame, in rewinding the film after completion of photographing on all frames, is arranged to effectively prevent information from being recorded again at the time of rewinding the film for any frame having magnetic information already recorded in a case where the film cartridge loaded into the camera contains a film in which part of frames have been already exposed. In the camera, when a film cartridge having some of film frames already exposed is loaded, the camera stores the position of a leading unexposed frame and to permit recording of magnetic information up to the leading unexposed frame in performing the recording action at the time of film rewinding.

13 Claims, 11 Drawing Sheets

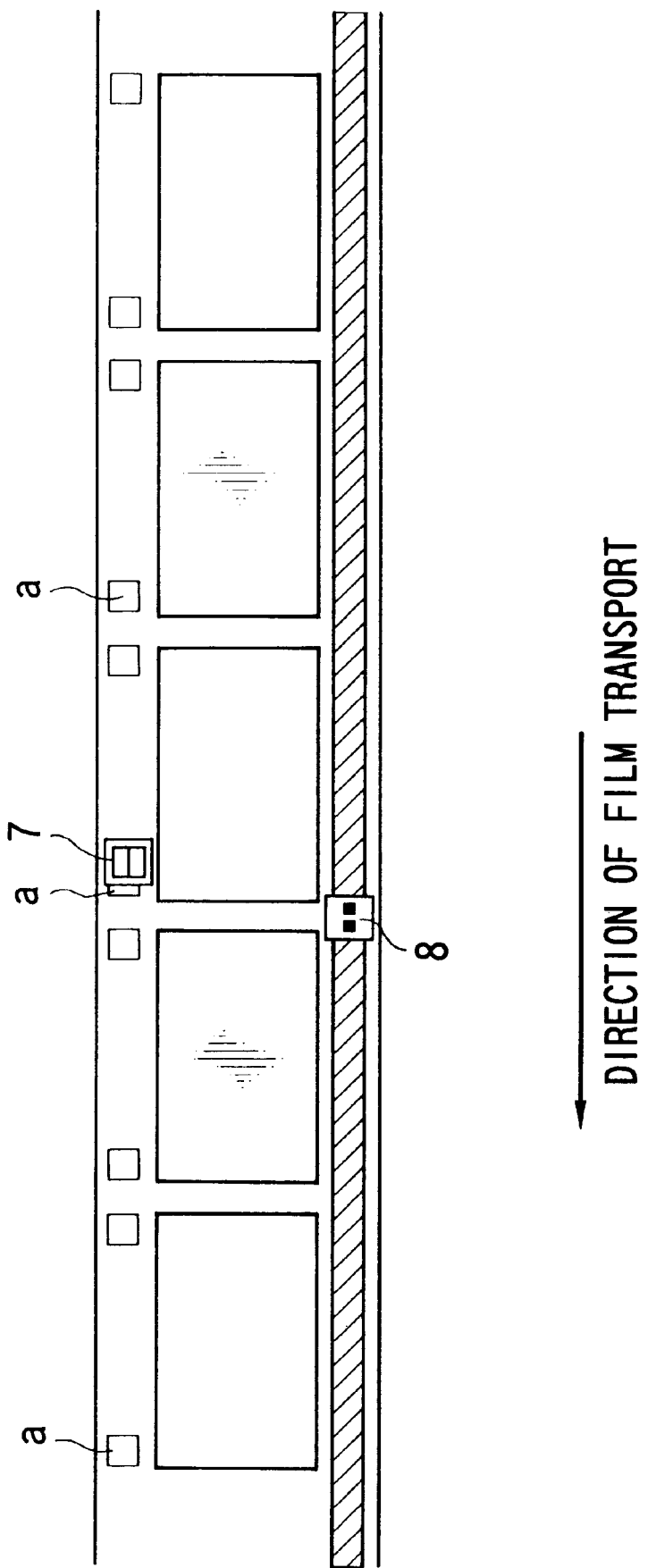

CAMERA CAPABLE OF MAGNETIC RECORDING

BACKGROUND OF THE INVENTION

1. Field of the Invention

The present invention relates to a camera having a magnetic head arranged to record and/or reproduce various magnetic signals in or from a magnetic layer provided on a film.

2. Description of Related Art

In Japanese Laid-Open Patent Application No. HEI 4-68329, there is disclosed a camera, which is arranged to record magnetic signals at film frames used for photographing (hereinafter referred to as exposed frames) with a magnetic head and to find the leading part of unexposed frame portions of the film by discriminating exposed frames from unexposed ones according to the presence or absence of the magnetic signals in a case where the camera is loaded again after the cartridge of the film is taken out before all frames are used for photographing. In Japanese Laid-Open Patent Application No. HEI 5-158165, there is disclosed a camera, which is arranged to retract a magnetic head from a film surface when it is not necessary to reproduce magnetic signals recorded on the film. In Japanese Laid-Open Patent Application No. HEI 5-183236, there is disclosed a camera, which is arranged to reproduce magnetic signals from a film in rewinding the film for the purpose of checking data recorded in winding the film.

Further, in Japanese Laid-Open Patent Application No. HEI 6-155526, there is disclosed a camera, which is arranged to write magnetic signals for all frames at the time of rewinding the film instead of recording magnetic signals every time one frame is wound after taking a shot.

Among these cameras of the prior art mentioned above, the camera arranged to perform magnetic recording for all frames at the time of rewinding the film has presented a problem as follows. In a case where the camera is loaded with a film cartridge containing a film already exposed in part, i.e., a partially exposed film, magnetic information might be recorded again, in rewinding the film, for exposed frames at which magnetic information has already been recorded.

Further, each of the cameras either arranged to record magnetic information (signals) at the time of film rewinding or arranged to record magnetic information every time a shot is taken for one frame necessitates an action of finding and fetching, to the aperture part of the camera, a frame which is in a leading position among unexposed frames when the camera is loaded with a film cartridge containing a partially exposed film. The frame fetching action is carried out by detecting magnetic information provided at each frame and by finding frames having no record of magnetic information. In this instance, the process of detecting the magnetic information is performed in moving one frame portion of the film currently located at the aperture position to an extent of one frame amount of the film. Therefore, when the leading (first) frame among the unexposed frames is found to have no record of magnetic information, a frame located next to the leading unexposed frame is already in the aperture position. The film, therefore, must be moved back by one frame amount when the first unexposed frame is found. Meanwhile, since the film counter of the camera is arranged to show the number of frames forwarded by incrementing its count by one every time one frame amount of the film is forwarded (transported), a frame number on display is larger by one than the frame number of the leading (first) unexposed frame with which a photographing operation is to be actually allowed to begin. This state of display is confusing to the operator of the camera.

Further, in the case of the camera of the type performing magnetic recording for all frames at the time of film rewinding, the magnetic head may be brought into pressed contact with the film only at the time of film rewinding by some switching means, which can be simply arranged to bring the magnetic head into contact with the film and to move it away from the film. However, if the camera is loaded with a film cartridge containing a partially exposed film, it becomes necessary to bring the magnetic head into contact with the film in search of the leading unexposed frame as mentioned above. To meet this requirement, the sequence of actions of the camera must be arranged to bring the camera once into a state of film rewinding and, after that, to bring it back into its normal sequence of actions in the above-stated case.

BRIEF SUMMARY OF THE INVENTION

It is an object of the invention to provide a camera which is of the kind recording information in a magnetic recording part provided at each of frames exposed, i.e., used for photographing, while the film is in process of rewinding after all frames of the film have been exposed for photographing and which is arranged to effectively prevent information from being recorded again in rewinding the film for any frame where information has already been recorded.

Under this object, in accordance with one aspect of the invention, there is provided a camera into which a cartridge containing a film having a magnetic recording part for each frame of the film is loaded and which, after performing a photographing action on each frame to bring a plurality of frames into an exposed state, records magnetic information in the magnetic recording part of each of the exposed frames, comprising determination means for, when a cartridge containing a film in which part of frames have been exposed and magnetic information has been recorded in the magnetic recording part of each of the exposed frames is loaded into the camera, determining whether a frame is the frame having magnetic information recorded in the magnetic recording part, photographing control means for performing photographing on each of unexposed frames in accordance with a result of determination provided by the determination means, and recording control means for, after photographing is performed on each frame by the photographing control means, recording magnetic information in the magnetic recording part of each frame which is determined by the determination means to have no magnetic information recorded. This arrangement enables the camera to effectively prevent magnetic information from being again recorded in the recording part of any frame having magnetic information already recorded, in a case where a recording action of magnetic information is to be performed on each frame when a plurality of frames are brought into an exposed state after completion of use of frames respectively for photographing.

In accordance with another aspect of the invention, there is provided a camera into which a cartridge containing a film having a magnetic recording part for each frame of the film is loaded and which, after performing a photographing action on each frame to bring a plurality of frames into an exposed state, records magnetic information in the magnetic recording part of each of the exposed frames, comprising restraining means for, when a cartridge containing a film in which part of frames have been exposed and magnetic information has been recorded in the magnetic recording part of each of the exposed frames is loaded into the camera, restraining a recording action of magnetic information to be performed for each frame after photographing. This arrangement enables the restraining means to inhibit the recording action of magnetic information on any frame having magnetic information already recorded, so that magnetic information is inhibited from being recorded again for any frame having magnetic information already recorded.

In accordance with a further aspect of the invention, there is provided a camera into which a cartridge containing a film having a magnetic recording part for each frame of the film is loaded and which, after performing a photographing action on each frame to bring each frame into an exposed state, records magnetic information in the magnetic recording part of each frame during rewinding of the film, comprising detecting means for, when a cartridge containing a film in which part of frames have been exposed and magnetic information has been recorded in the magnetic recording part of each of the exposed frames is loaded into the camera, detecting information on a boundary position between exposed frames and unexposed frames during winding of the film, and recording control means for recording, during rewinding of the film, magnetic information on a frame having no magnetic information recorded in the magnetic recording part, on the basis of information on the boundary position between exposed frames and unexposed frames detected by the detecting means. This arrangement enables the camera to prevent magnetic information from being recorded again for any frame having magnetic information already recorded.

In accordance with a further aspect of the invention, there is provided a camera into which a cartridge containing a film having a magnetic recording part for each frame of the film is loaded and which records magnetic information in the magnetic recording part of each of exposed frames, counts a frame number and provides a frame number display every time one frame is transported, comprising determination means for, when a cartridge containing a film in which part of frames have been exposed and magnetic information has been recorded in the magnetic recording part of each of the exposed frames is loaded into the camera, determining whether a frame is the frame having magnetic information recorded, by detecting magnetic information in the magnetic recording part of each frame every time each frame is transported, leading part fetching means for performing a leading part fetching action to cause an unexposed frame located next to an exposed frame to be fetched to an aperture position in accordance with a result of determination provided by the determination means, and display control means for causing the frame number display provided upon completion of the leading part fetching action to coincide with a frame number of the unexposed frame fetched to the aperture position and for causing the frame number display provided in process of the leading part fetching action to vary in one direction up to the frame number of the unexposed frame fetched to the aperture position. This arrangement enables the frame number display to be accurately provided upon completion of the leading part fetching action and to be prevented from exceeding an actual frame number.

In accordance with a still further aspect of the invention, there is provided a camera into which a cartridge containing a film having a magnetic recording part for each frame of the film is loaded and which, after performing a photographing action on each frame to bring a plurality of frames into an exposed state, records magnetic information in the magnetic recording part of each of the exposed frames, comprising head state control means for causing a magnetic head provided for recording on the magnetic recording part to come into pressed contact with the magnetic recording part in recording the magnetic information, when a cartridge containing a film in which all frames are unexposed is loaded into the camera, and to come into pressed contact with the magnetic recording part both in recording the magnetic information and in fetching a leading unexposed frame to an aperture position before photographing, when a cartridge containing a film in which part of frames have been exposed and magnetic information has been recorded in the magnetic recording part of each of the exposed frames. The head state control means not only simplifies an action of switching the magnetic head between a state of being in pressed contact with the film and a state of not being in contact with the film but also enables the camera to appositely operate in a case where the camera is loaded with a cartridge containing a film in a partially exposed state.

These and other aspects and features of the invention will become apparent from the following detailed description of embodiments thereof taken in connection with the accompanying drawings.

BRIEF DESCRIPTION OF THE SEVERAL VIEWS OF THE DRAWING

FIG. 11 shows the arrangement of a film to be used by cameras according to the invention.

DETAILED DESCRIPTION OF THE INVENTION

Preferred embodiments of the present invention will be hereinafter described in detail with reference to the drawings.

Figure 1:
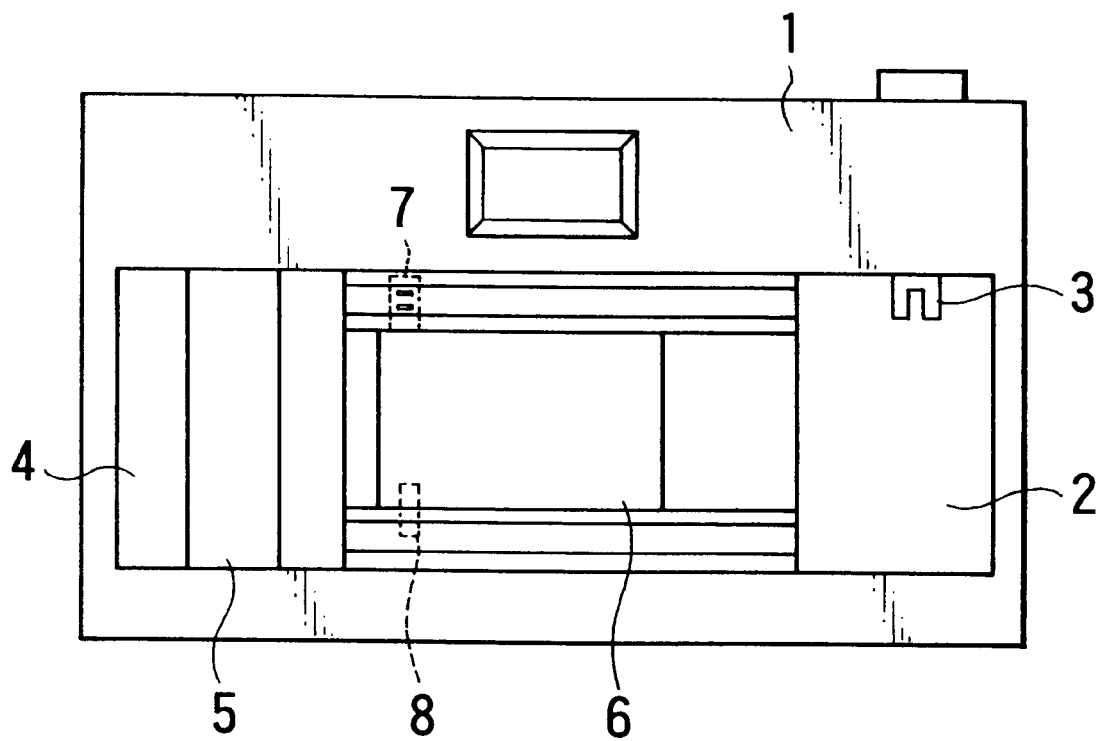
FIG. 1 is a rear view showing a camera arranged according to the invention as an embodiment thereof.

FIG. 1 is a rear view showing, with a back cover removed, the rear side of a camera arranged as a first embodiment of the invention.

The illustration of FIG. 1 includes a camera body 1, a cartridge chamber 2, a fork 3, a spool chamber 4, a film take-up spool 5 and an aperture 6 which is provided in the camera for exposing a film to light. A photo-reflector 7 is disposed in an upper left part on the rear side as viewed in FIG. 7 and is arranged to detect a perforation of the film between a frame located currently in a photographing position and the next frame. A magnetic head 8 is arranged to come into pressed contact with a magnetic layer of the film and to magnetically record or reproduce information into or from the magnetic layer of the film.

Figure 2:
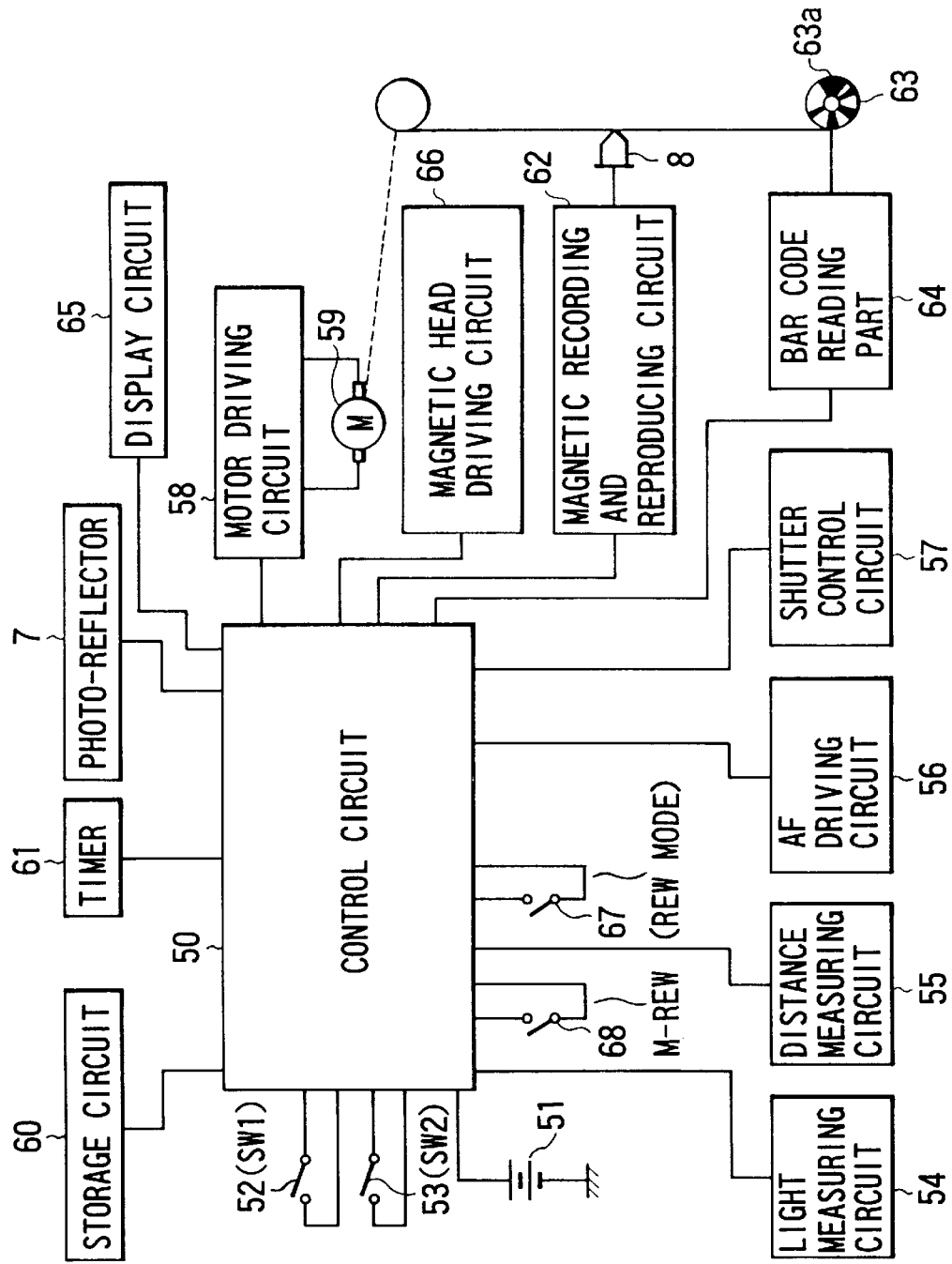
FIG. 2 is a circuit diagram showing circuits of the camera arranged as the embodiment of the invention.

FIG. 2 shows in a block diagram the circuit arrangement of the above-stated camera. Referring to FIG. 2, a control circuit 50 is arranged to control various circuits of the camera and is composed of a microprocessor, etc. A battery 51 is arranged as a power source. A switch 52 is arranged to be turned on by the first stroke of a shutter release button. A release switch 53 is arranged to be turned on by the second stroke of the shutter release button. A light measuring circuit 54 is arranged to measure the luminance of an object to be photographed. A distance measuring circuit 55 is arranged to measure a distance to the object. An AF (automatic focusing) driving circuit 56 is arranged to adjust the focus of a photo-taking lens (not shown) on the basis of information on the distance measured by the distance measuring circuit 55. A shutter control circuit 57 is arranged to control the opening and closing actions of a shutter. A motor driving circuit 58 is arranged to drive a film transport motor 59. A storage circuit 60 is composed of a nonvolatile storage element such as an EEPROM, etc. A timer 61 is provided for the control circuit 50. A magnetic recording and reproducing circuit 62 is arranged as a magnetic processing circuit to record and reproduce information on and from the film. A bar code reading part 64 is arranged to read from a bar code disk 63 of a cartridge a number of film frames and a state of use of the film recorded in bar codes on the bar code disk 63. A display circuit 65 is arranged to display a shutter time value (Tv) and an aperture value (Av) and also to provide a warning display relative to an error of the magnetic recording and reproducing circuit 62. A magnetic head driving circuit 66 is arranged to cause the magnetic head 8 to come into contact with the surface of the film and to retract the head 8 from the film surface. A film rewinding mode setting switch 67 is arranged, for example, to bring about an automatic rewinding (abbreviated to A.REW) mode when it is in an on-state and a manual rewinding (abbreviated to M.REW) mode when it is in an off-state. There is provided a manual rewinding start button 68 for manual film rewinding.

Figure 3:
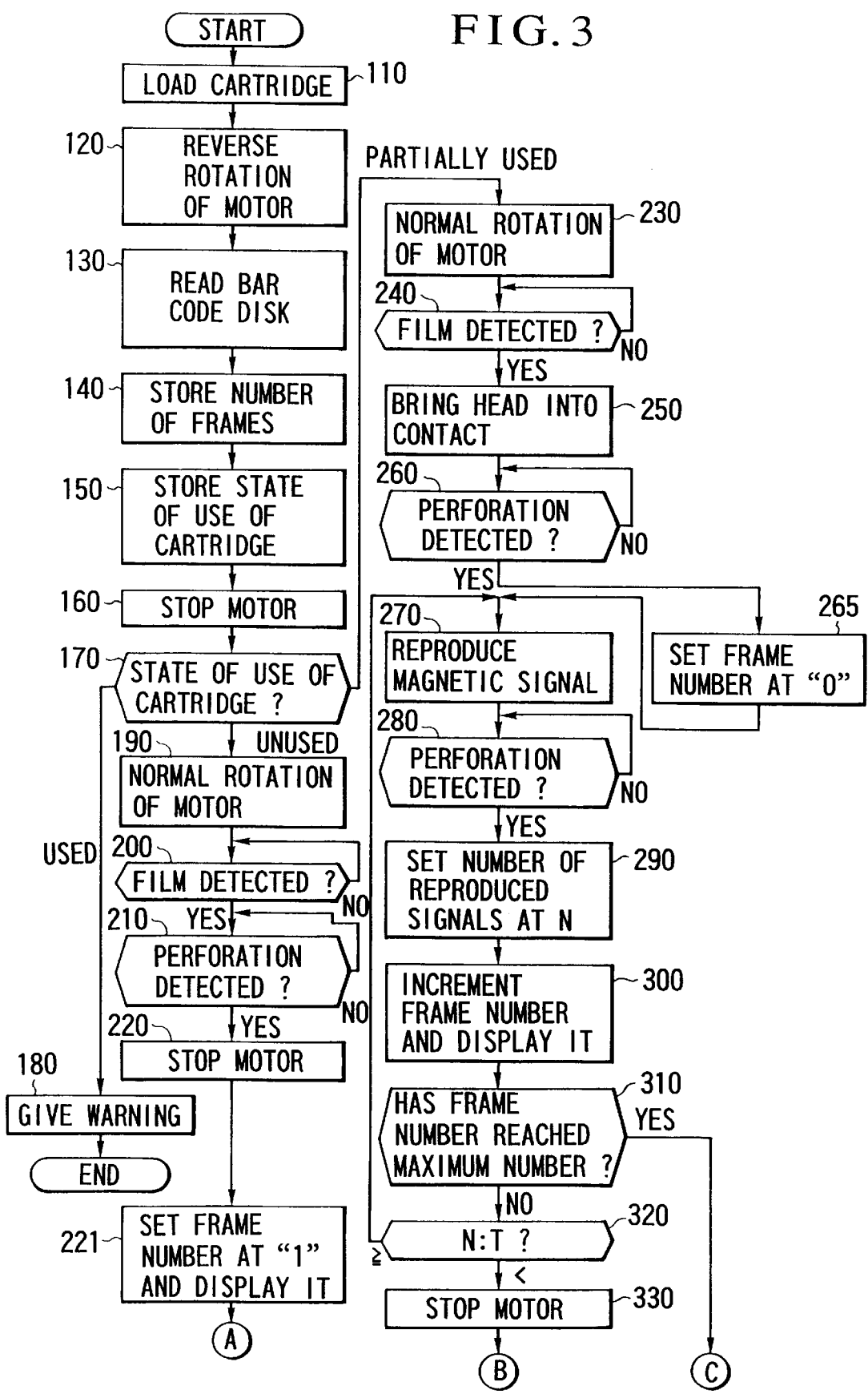
FIG. 3 is a flow chart showing a flow of operation of the camera shown in FIG. 2.

FIG. 3 is a flow chart showing an operation of the control circuit 50 with the control circuit 50 assumed to be composed of a microprocessor.

Referring to FIG. 3, when the camera is loaded with a film cartridge at a step 110, the flow of operation proceeds to a step 120. At the step 120, the film transport motor 59 is driven to rotate in the direction of film rewinding. This rotation causes a spool disposed within the film cartridge to rotate. At a step 130, the control circuit 50 reads from the bar code disk 63 of the film cartridge the information on a total number of photographable frames and the state of use of the film cartridge recorded on the bar code disk 63. At steps 140 and 150, the total number of photographable frames and the state of use of the film cartridge (an unused state, a partially used state or a used state) are stored. The bar code disk 63 on the film cartridge is arranged such that, if the film cartridge has not been used in its initial stage after loading it on the camera, the initial code part 63*a* of the bar code disk 63 (see FIG. 2) is located at a first position relative to a reading part which is composed of a photo-coupler. In the case of a film cartridge in which all film frames have been used, i.e., exposed, the initial code part 63*a* is located at a second position which differs from the first position relative to the reading part. Further, if the film cartridge has its film rewound into it in a partially exposed state, i.e., a partially used state, the initial code part 63*a* is located at a third position which differs from the first and second positions relative to the reading part in its initial stage after loading. Such being the arrangement, the state of use of the film cartridge currently loaded into the camera can be found by detecting the initial position of the initial code part 63*a* by sensing the time required to detect the initial code part 63*a* in reading the information at the step 130. At a step 160, a driving action on the film transport motor 59 is brought to a stop.

At a step 170, a check is made for the state of use of the film cartridge currently loaded into the camera on the basis of information on the state of use of the film cartridge stored at the above-stated step 150. If the film cartridge is found to be in the used state, the flow of operation proceeds from the step 170 to a step 180. At the step 180, the display circuit 65 is caused to provide a warning display, and the flow of operation comes to an end without winding the film.

If the film cartridge is found to be in the unused state at the step 170, the flow proceeds from the step 170 to a step 190. At the step 190, a film winding action begins by causing the film transport motor 59 to make a normal rotation. At the next step 200, the output of the photo-reflector 7 is checked to find if the leader part of the film sent out from the film cartridge has passed the position of the photo-reflector 7. If so, the flow proceeds to a step 210. At the step 210, the output of the photo-reflector 7 is checked to find if a perforation of the film has been detected. If so, the flow proceeds to a step 220. At the step 220, the driving action on the film transport motor 59 is brought to a stop. At a step 221, a frame number is set at "1". The value "1" is displayed by a display member such as an LCD of the camera. The flow then proceeds to a step 410 and subsequent steps shown in FIG. 5.

As shown in FIG. 11, in the film to be used by the camera, two perforations are provided for each frame of the film. The flow of operation proceeds to the step 220 when a perforation "a" located at the leading point of a frame is detected at the step 210.

Figure 6:
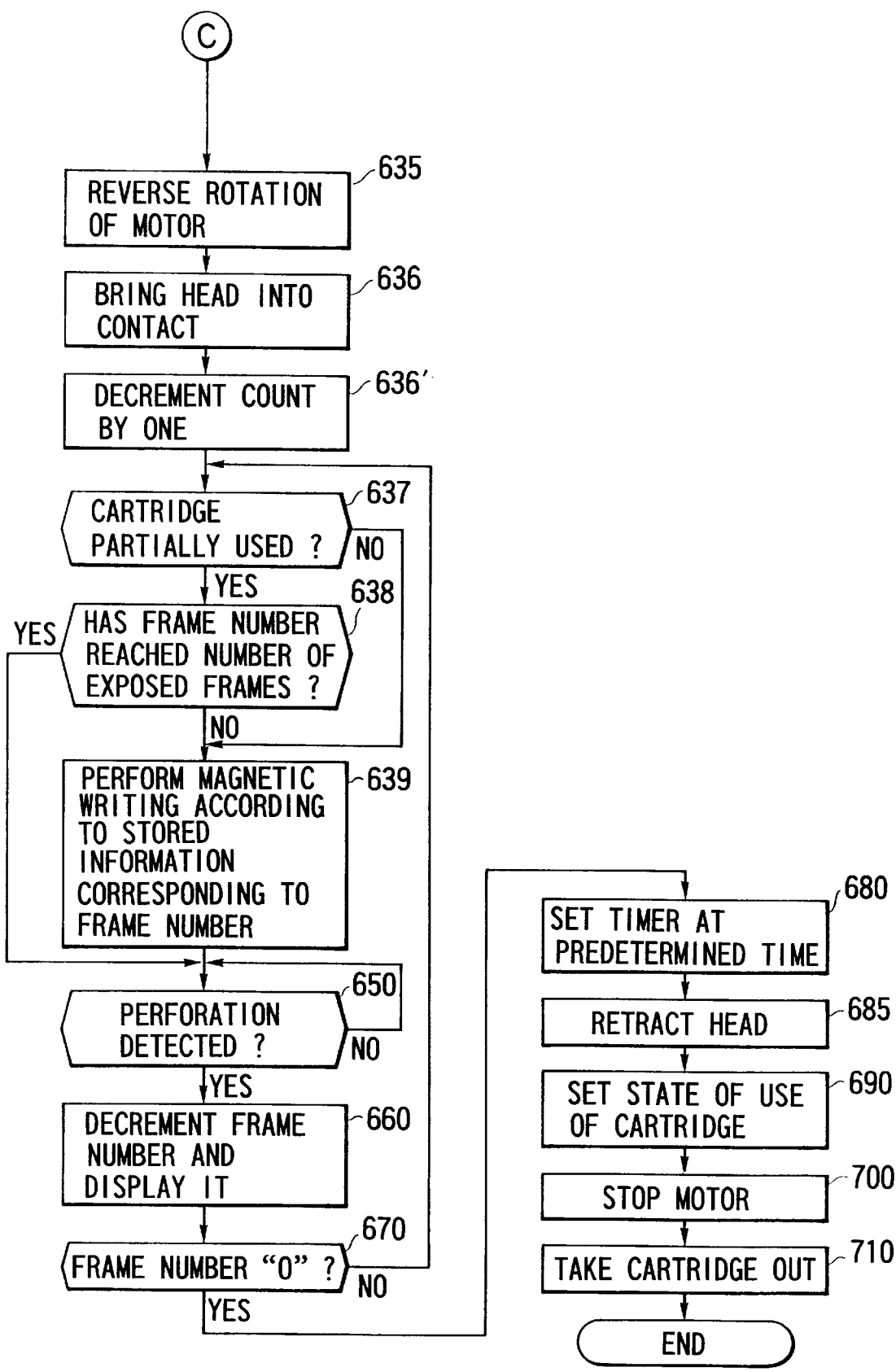
FIG. 6 is a flow chart showing the flow of operation of the camera together with FIGS. 3, 4 and 5.

If the film cartridge is found at the step 170 to be in the partially used state, the flow proceeds from the step 170 to a step 230. At the step 230, the film winding action is allowed to begin by causing the film transport motor 59 to make a normal rotation. At a step 240, the output of the photo-reflector 7 is checked to find if the leader part of the film sent out from the film cartridge has passed the position of the photo-reflector 7. After that, the flow proceeds to a step 250. At the step 250, the magnetic head driving circuit 66 is caused to bring the magnetic head 8 into contact with the surface of the film. At a step 260, the photo-reflector 7 is checked to find if the leading perforation "a" has been detected. If so, the flow proceeds to a step 265 to set the frame number at "0". However, the frame number is not displayed at this point of time. At a step 270, magnetic signals recorded on the film are reproduced. At a step 280, the number of pulses of data, i.e., the number of reproduced signals, are counted until the leading perforation "a" of the next frame is detected. When the next perforation "a" is detected, the flow proceeds to a step 290. At the step 290, the number of reproduced signals is read and the value thus read is set as N. At the next step 300, the frame number is incremented by one and the new frame number is displayed. At a step 310, a check is made to find if the frame number has reached the (specified) number of photographable frames read at the step 140. If so, the flow proceeds to a step 635, which is shown in FIG. 6 and is provided for film rewinding.

Figure 4:
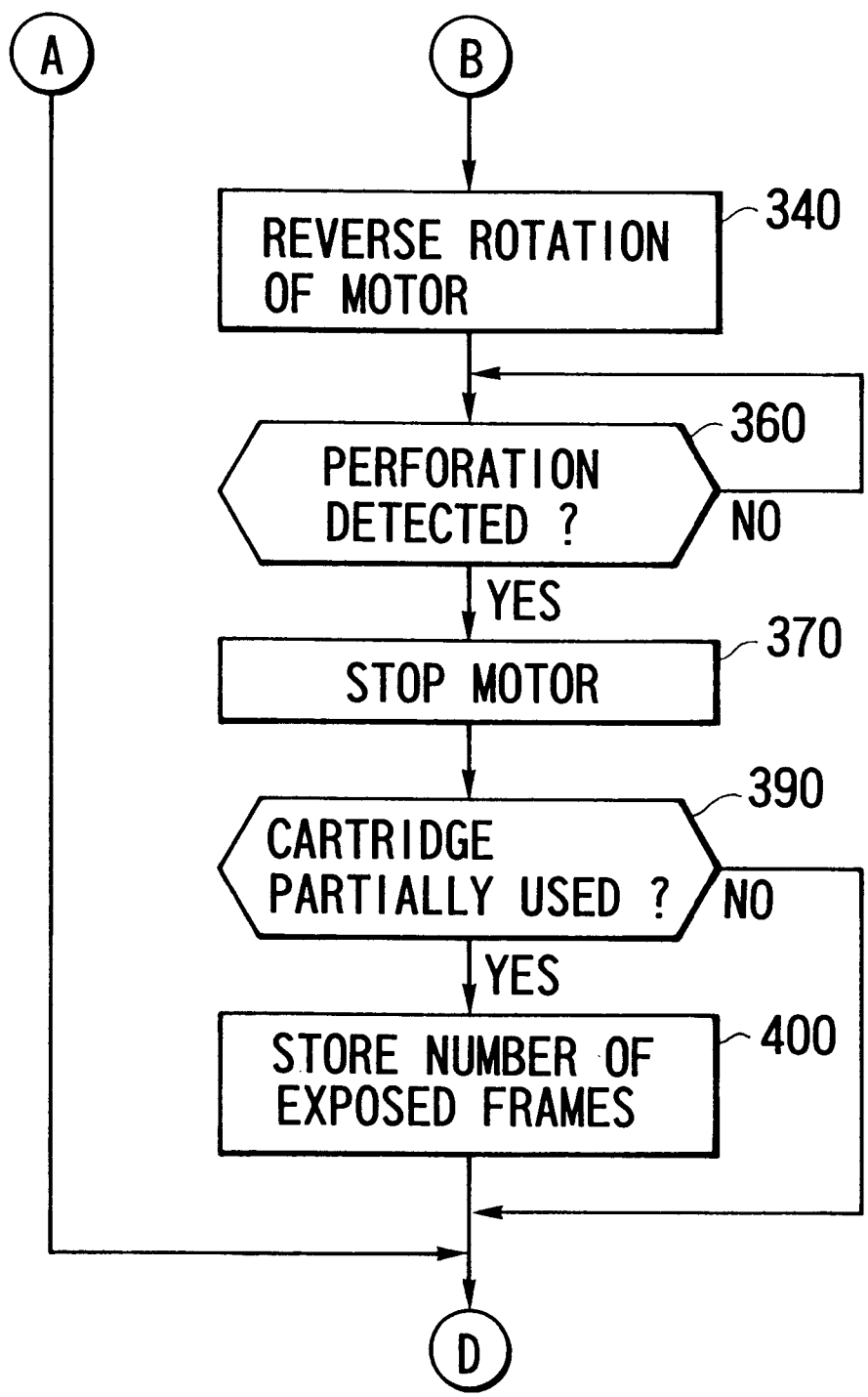
FIG. 4 is a flow chart showing the flow of operation of the camera together with FIG. 3.

If the frame number is found not to have reached the specified (maximum) number of photographable frames at the step 310, the flow of operation proceeds to a step 320. At the step 320, a check is made to find if the reproduced number of signals N is equal to or greater than a predetermined value T. If so, the frame is judged to be an exposed frame, and the flow returns to the step 270. If not, the frame is judged to be an unexposed frame, and the flow proceeds to a step 330. At the step 330, the film transport motor 59 is brought to a stop to end film winding. The flow then proceeds to a step 340 which is shown in FIG. 4.

At the step 340, the film transport motor 59 is caused to make a reverse rotation to start transporting the film in the direction of rewinding. At a step 360, a check is made for the next perforation (a leading perforation "a" of a frame preceding the current frame by one frame portion of film). Upon detection of the next perforation, the flow proceeds to a step 370 to stop the motor 59 from rotating. In other words, the film is thus rewound here to the extent of one frame amount.

At a step 390, the information on the state of use of the film cartridge stored at the step 150 is checked to find if the film cartridge is in the partially used state. If so, the flow proceeds to a step 400 to store information on the number of exposed frames contained in the partially used film cartridge. A nonvolatile storage element such as an EEPROM is used for storing it. The value stored at the step 400 is obtained by subtracting "1" from the count value obtained at the step 300.

If the film cartridge is found not to be in the partially used state, i.e., it is in a totally unexposed state in this instance, the flow of operation skips the storing routine of the step 400. After the step 390 or 400, the flow proceeds to a step 410 which is shown in FIG. 5.

Figure 5:
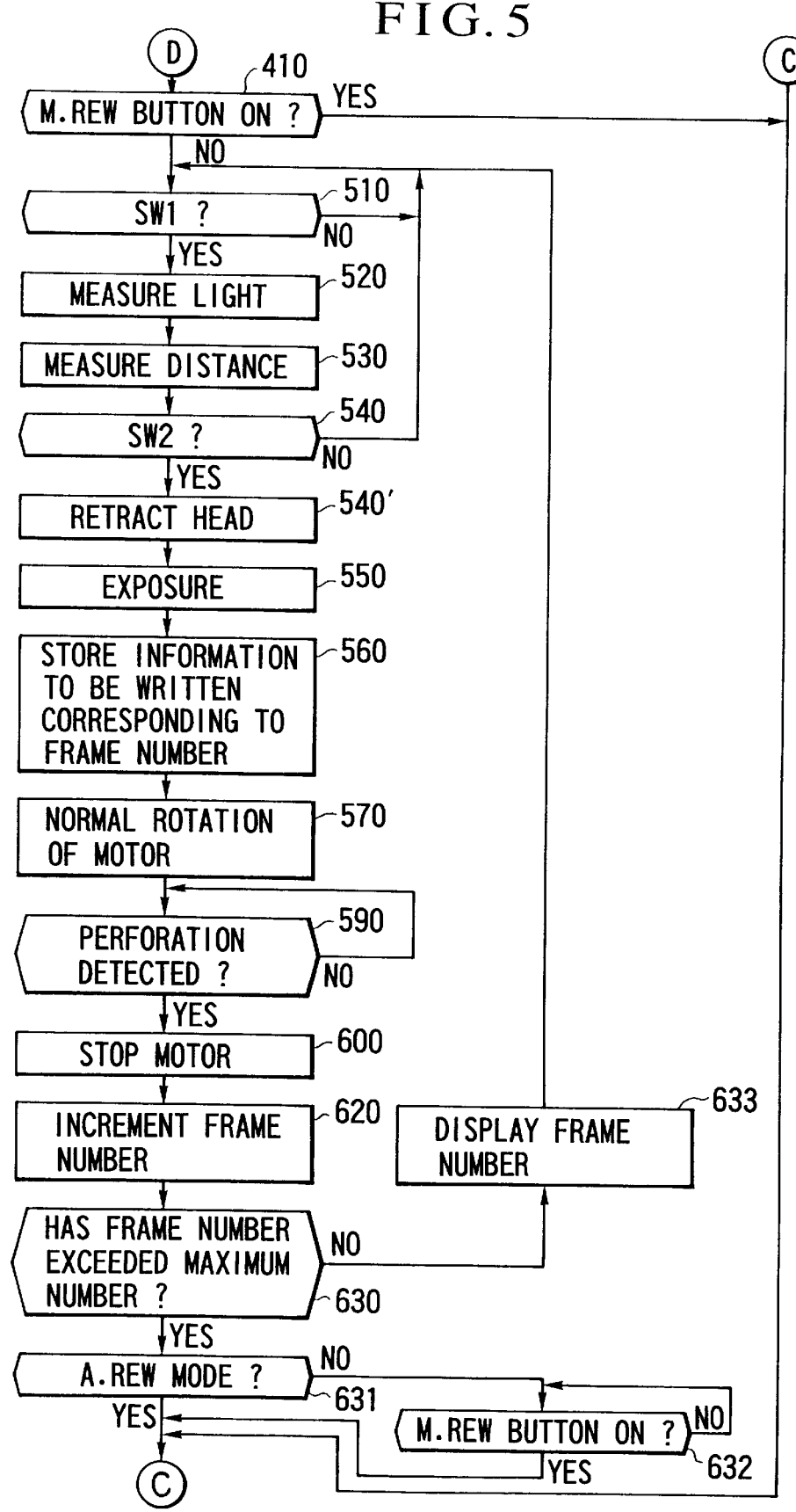
FIG. 5 is a flow chart showing the flow of operation of the camera together with FIGS. 3 and 4.

Referring to FIG. 5, at the step 410, a check is made to find if the manual rewinding start button (M.REW) 68 has been turned on. If so, the flow proceeds to a step 635 provided for a rewinding routine as shown in FIG. 6. If not, the flow proceeds to a step 510. At the step 510, a check is made for the state of the switch 52 (SW1) to find if the switch 52 is turned on by the first stroke of the shutter release button of the camera. If so, the flow proceeds to a step 520. At the step 520, a light measuring action is performed for photographing. A shutter time value and an aperture value are decided according to light thus measured. At a step 530, a distance measuring action is performed and automatic focus adjustment is carried out in a known manner. At a step 540, a check is made for the state of the switch 53 (SW2) to find if the switch 53 is turned on by the second stroke of the shutter release button. If so, the flow proceeds to a step 540'. If not, the flow returns to the routine of the step 510. At the step 540', the magnetic head 8 is retracted from the film surface, and the flow proceeds to a step 550. At the step 550, the film is exposed to light by controlling the shutter on the basis of the shutter time decided and by controlling a diaphragm on the basis of the aperture value decided as mentioned above. After completion of the exposure, the flow proceeds to a step 560.

At the step 560, information on the photographing conditions for the current frame, such as the shutter time, the aperture value, the luminance of an object to be photographed, etc., is stored in a nonvolatile storage element or the like together with the frame number, which is a count number obtained by a counter.

At the next step 570, film winding is caused to begin by causing the film transport motor 59 to make a normal rotation.

At a step 590, a check is made for detection by the photo-reflector 7 of the leading perforation "a" of the next frame. When the perforation is detected, the flow proceeds to a step 600. At the step 600, the process of film winding is brought to an end by stopping the film transport motor 59 from being driven. At the next step 620, the frame number is incremented by one.

At a step 630, a check is made to find if the frame number counted has exceeded the specified number of photographable frames stored at the step 140. If not, the flow proceeds to a step 633 to display the frame number, and then returns to the step 510 to carry on the photographing actions. If the frame number is found at the step 630 to have exceeded the specified number of photographable frames, the flow proceeds to a step 631. At the step 631, a check is made for the state of the film rewinding mode setting switch 67 to find if the current film rewinding mode is the automatic rewinding (A.REW) mode. If so, the flow proceeds to a step 635 which is shown in FIG. 6. In the event of the manual rewinding start mode, the flow proceeds to a step 632 to wait for turning-on of the M.REW switch 68. When this switch 68 is turned on, the flow proceeds to the step 635.

At the step 635, the film is caused to be transported in the direction of film rewinding by causing the film transport motor 59 to make a reverse rotation. At a step 636, the magnetic head 8 is brought into contact with the film. At a step 636', the count value of the counter is decremented by one. The flow then proceeds to a step 637.

At the step 637, a check is made, on the basis of information stored at the step 150, to find if the film cartridge has been in the partially used state when the camera is loaded with it. If so, the flow proceeds to a step 638. At the step 638, a check is made to find if the current frame number (the count value of the counter) has reached the number of exposed frames stored at the step 400. If not, the flow proceeds to a step 639. At the step 639, information which is stored at the step 560 for the frame of the frame number (count value of the counter) is written into the magnetic recording layer of the film in accordance with a predetermined format.

If the film cartridge is found at the step 637 to have been in the totally unexposed state when it is loaded, the flow proceeds immediately to the step 639 to execute the magnetic writing process, skipping the check to be made at the step 638.

If the frame number is found at the step 638 to have reached the number of exposed frames, the flow proceeds to a step 650 without executing the magnetic writing step 639. At the step 650, a check is made for detection of the leading perforation "a" of each frame to find if one frame amount of the film has been transported. If so, the flow proceeds to a step 660. At the step 660, the count value of the counter is decremented by one and the value thus obtained is displayed. At the next step 670, a check is made to find if the count value of the counter is "0". If not, the flow returns to the step 637. If so, the flow proceeds to a step 680.

At the step 680, a timer of a predetermined time is set. This timer is provided for causing the flow to wait for a predetermined period of time necessary before the film is completely wound into the film cartridge. After the lapse of the predetermined time, the flow proceeds to a step 685 to have the magnetic head 8 retracted from the film. At the next step 690, the initial code part 63a of the bar code disk 63 is set in a position according to the current state of use of the film cartridge, which is one of the three states including the unexposed (unused) state, the partially exposed (partially used) state and the totally exposed (used) state. At the next step 700, the process of film rewinding is brought to an end by stopping the film transport motor 59 from rotating.

At a step 710, the film cartridge is taken out, and the sequence of processes described comes to an end.

Further, when the number of exposed frames is found to have reached the maximum number of frames at the step 310, with a film cartridge loaded in the partially exposed state, or when the manual film rewinding start button 68 is found to be turned on at the step 410, the flow of operation immediately enters into the film rewinding start routine of the step 635.

FIGS. 7 to 10 are flow charts showing flows of operation of a camera according to a second embodiment of the invention. In these flow charts, the steps which are to be executed in the same manner as the steps shown in FIGS. 3 to 6 are indicated by the same step numbers as in FIGS. 3 to 6. The second embodiment is arranged in the same manner as the first embodiment described above, except in the following points. In the second embodiment, when the camera is loaded with a partially exposed film cartridge, information on the position of a leading frame of unexposed frames is stored at the step 401 of FIG. 8. In rewinding the film, a check is made at a step 638B of FIG. 10 to find if the film frame rewinding position has passed the position of the leading unexposed frame and, if so, the control circuit 50 inhibits information writing. The film rewinding arrangement adapted for a case where the camera is loaded with a partially exposed film cartridge also differs from the arrangement of the first embodiment described above.

The following description of the operation of the second embodiment covers mainly the points where the second embodiment differs from the first embodiment.

Figure 7:
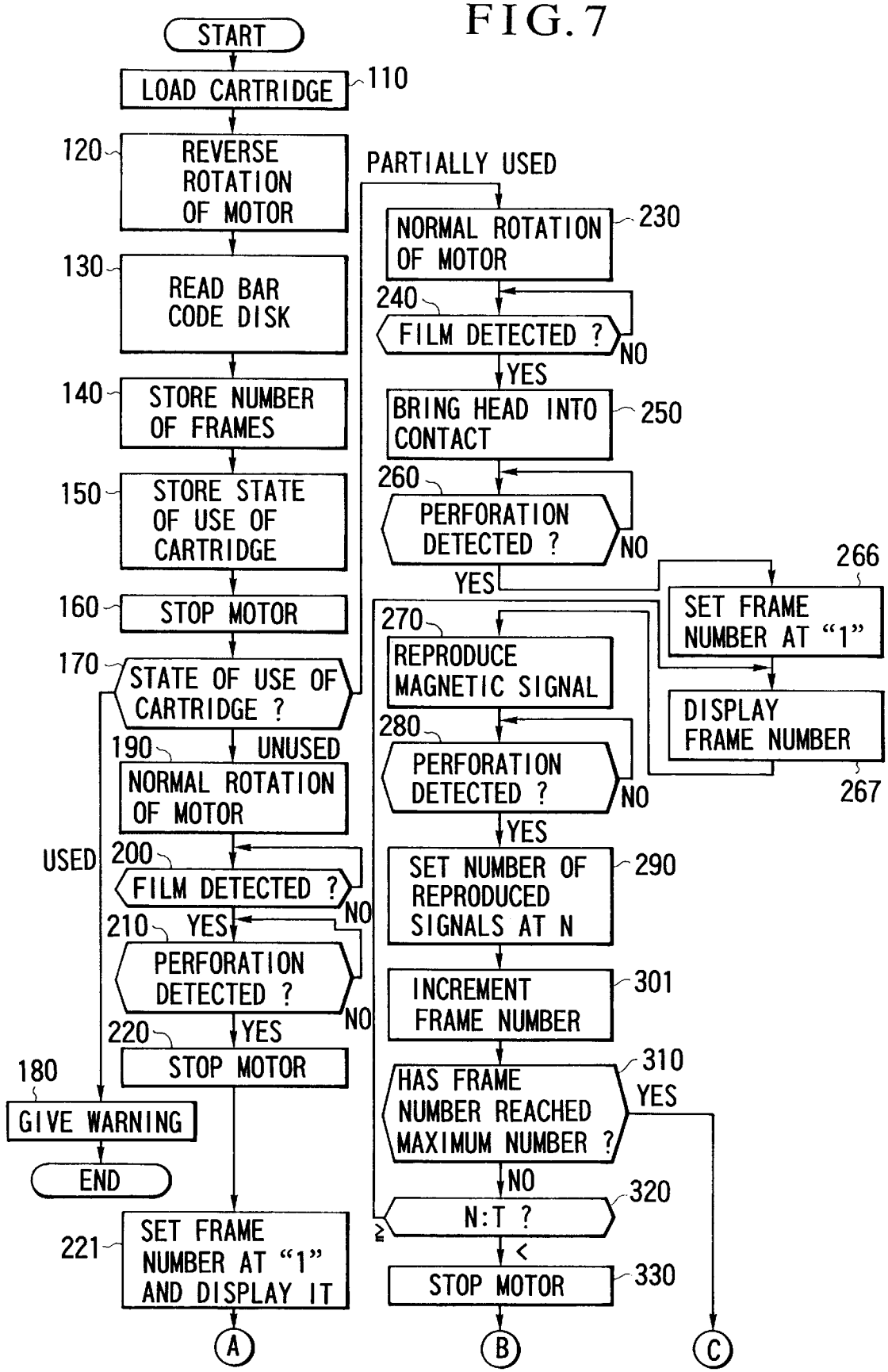
FIG. 7 is a flow chart showing in part a flow of operation of a camera arranged according to the invention as another embodiment thereof.

Referring to FIG. 7, in a case where the camera is loaded with a partially exposed film cartridge, steps 110 to 170 and steps 230 to 260 are executed, so that the leading part of the first frame is thus fetched to a predetermined position by finding the leading perforation "a" of the first frame. At a step 266, the frame number is set at "1" in the frame counter. At a step 267, the frame number is displayed. After that, steps 270 to 290 are executed to reproduce the magnetic signals of the frame. Then, with a one-frame winding action performed, the count value of the counter is incremented by one at the step 301. Steps 310 and 320 are executed to find if the frame for which the magnetic signals are reproduced is an exposed frame. If so, the flow proceeds to the step 267 to display the frame number of the frame currently wound up.

Figure 8:
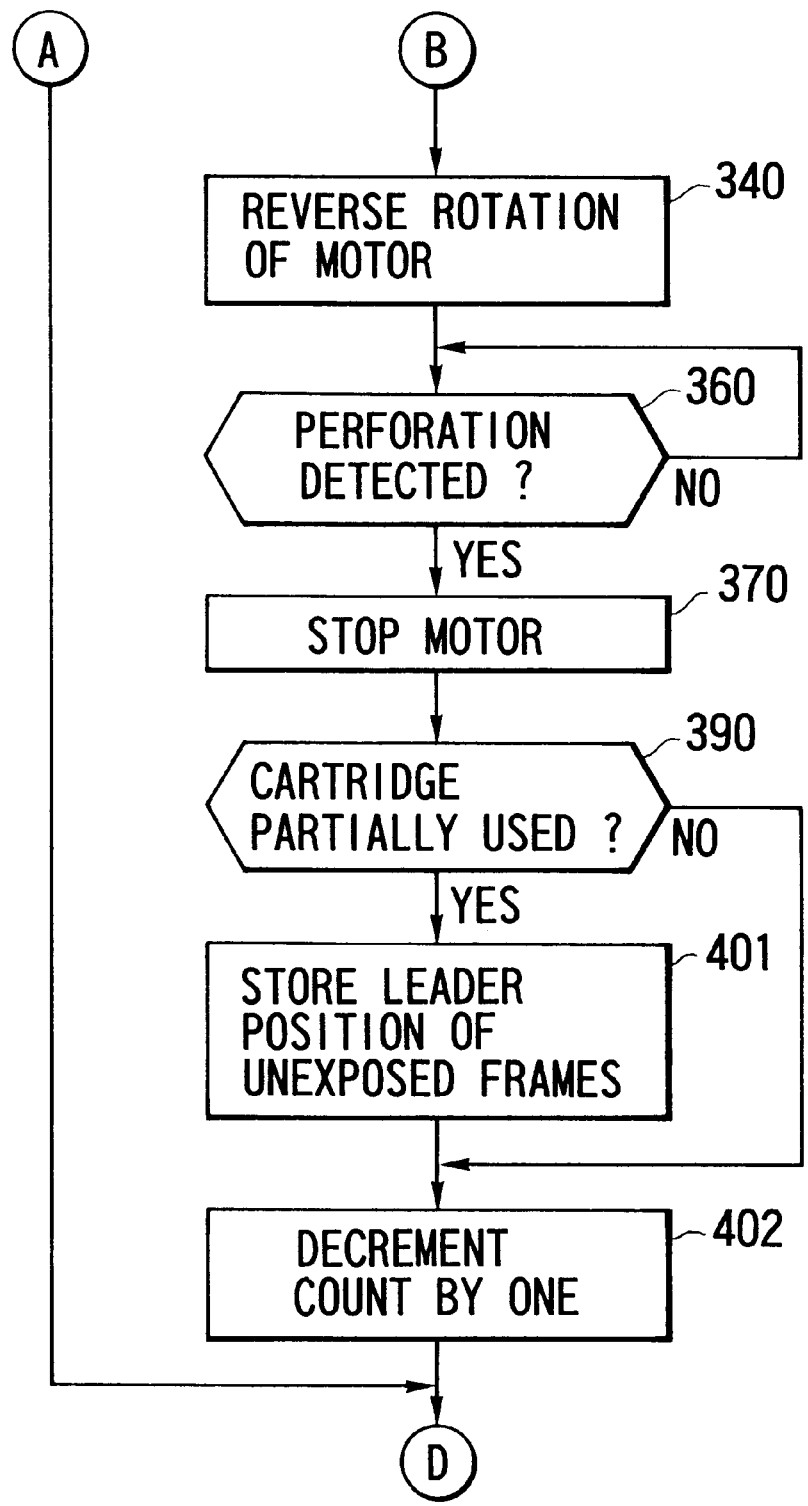
FIG. 8 is a flow chart showing the flow of operation of the camera together with FIG. 7.
Figure 9:
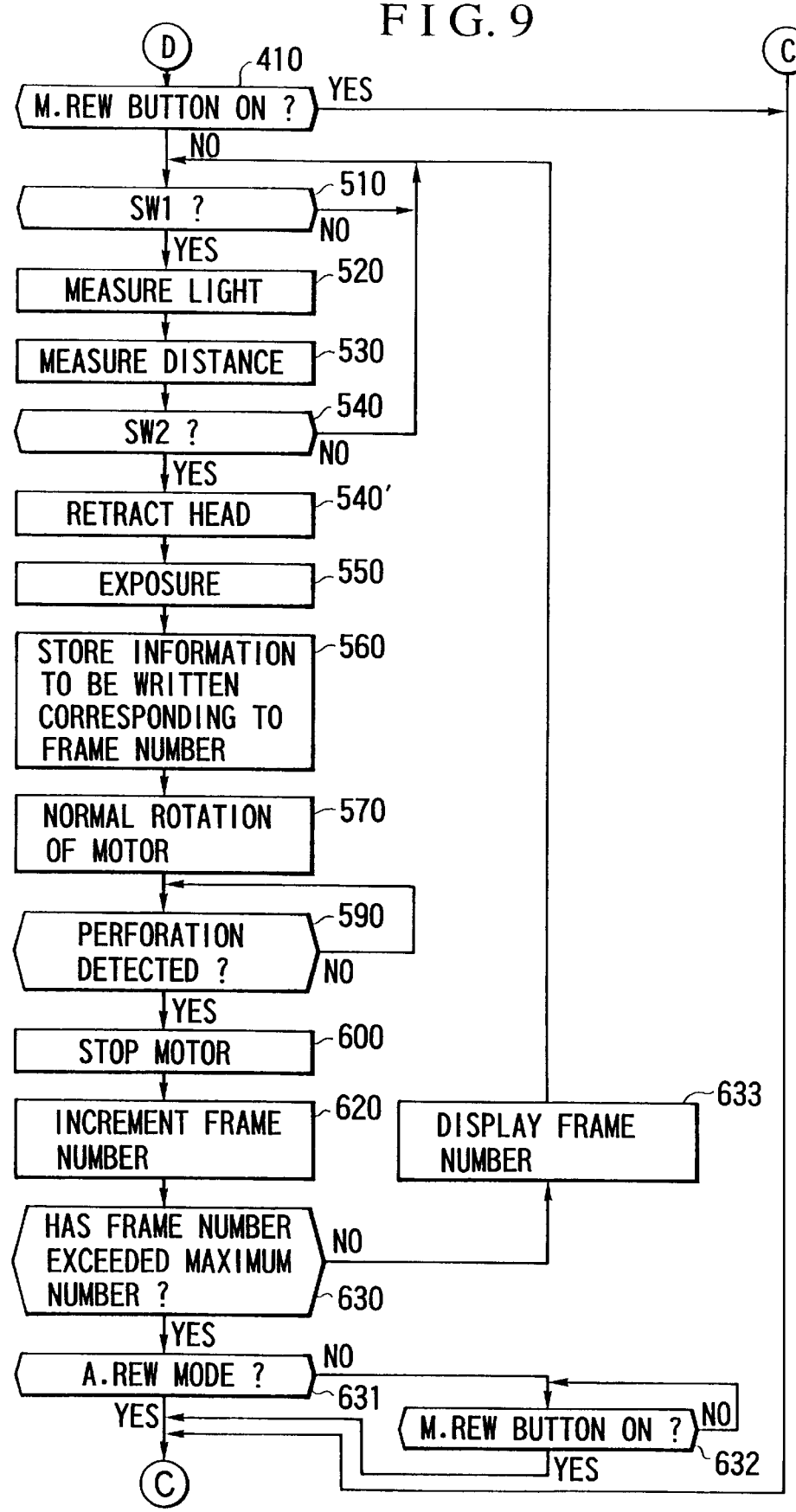
FIG. 9 is a flow chart showing the flow of operation of the camera together with FIGS. 7 and 8.
Figure 10:
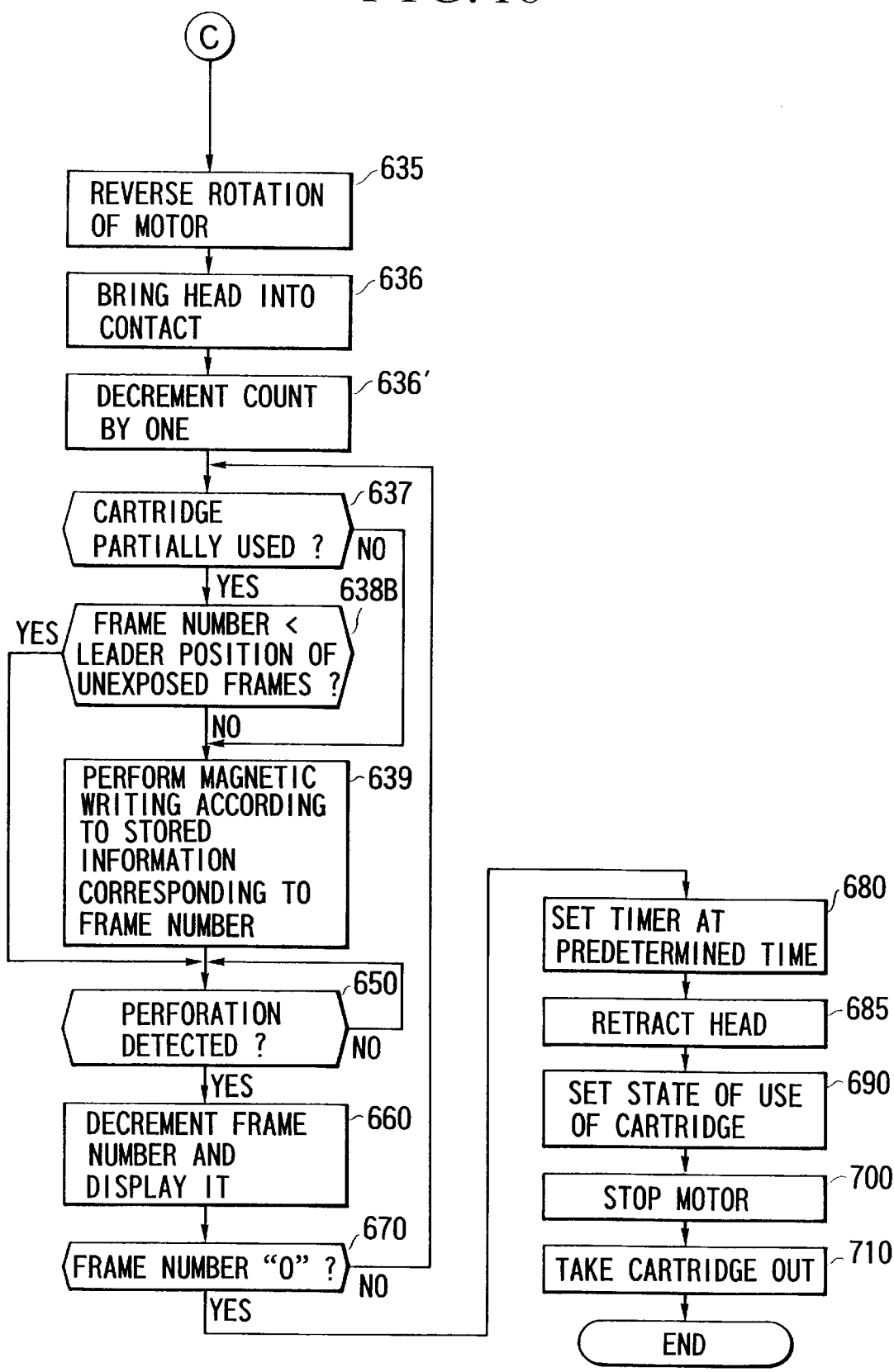
FIG. 10 is a flow chart showing the flow of operation of the camera together with FIGS. 7, 8 and 9.

During the flow of these processes, a leading unexposed frame is wound up, and, when the frame is judged to be an unexposed frame through the signals reproduced from the frame, the flow proceeds to the step 330. In this instance, a frame located next to the leading unexposed frame is at the aperture position and the count value of the counter also represents the frame number of the next frame. However, since the step 267 for the frame number display is not executed when the leading unexposed frame is judged to be an unexposed frame, the frame number on display is a number less by one than the counted frame number and thus indicates the frame number of the leading unexposed frame. After that, steps 340 to 370 of FIG. 8 are executed to rewind the film by one frame amount. The leading unexposed frame is thus moved to the aperture position. The frame number of the frame thus brought to the aperture position then comes to coincide with the frame number on display. At a step 401, the frame number of the leading unexposed frame detected is stored. The frame number thus stored is a value less by one than the frame number counted by the counter immediately before the step 340. At a step 402, the count value of the counter is decremented by one to make it coincide with the frame number of the frame currently located in the aperture position. After the step 402, the flow proceeds to execute steps 410 to 632 which are shown in FIG. 9. Through these steps 410 to 632, each frame is exposed to light and information relative to these frames are stored. After all frames are exposed to light, the flow comes to execute steps 635 to 710 which are shown in FIG. 10. In the case of the second embodiment, at a step 638B, the count value of the counter becomes less than the frame number of the leading unexposed frame, i.e., a leader position of unexposed frames, stored at the step 401. Then, the stored information is magnetically recorded in rewinding each of frames until a leading frame among the unexposed frames comes to the aperture position.

Further, this embodiment is arranged to make the frame number display in the manner described above on the assumption that the camera is arranged to perform the magnetic writing at the time of film rewinding when the camera is loaded with a partially exposed film cartridge. However, the same method of making the frame number display according to the invention applies also to a camera arranged to perform the magnetic writing at the time of winding the film, instead of at the time of rewinding.

I claim:

1. A camera into which a cartridge containing a film having a magnetic recording part for each frame of the film is loaded and which, after performing a photographing action on each frame to bring a plurality of frames into an exposed state, records magnetic information in the magnetic recording part of each of the exposed frames, said camera comprising:

a) a determination circuit for determining whether or not magnetic information is recorded in the magnetic recording part of each frame while the film is being transported;

b) a computation portion for providing information of a frame number with respect to a boundary position between an unexposed frame and an exposed frame on the basis of determination results of the determination circuit;

c) a memorization portion of memorizing the information of the frame number;

d) photographing control means for performing photographing on each of unexposed frames in accordance with a result of determination provided by said determination means; and e) recording control means for controlling as to up to which frame the recording should be effected on the basis of the frame number information memorized in the memorization portion and for recording magnetic information in the magnetic recording part of each frame photographed by the photographing control means.

2. A camera according to claim 1, wherein said photographing control means performs photographing on all unexposed frames sequentially, and wherein after photographing on all the frames by said photographing control means is completed, said recording control means records magnetic information in the magnetic recording part of each of the frames.

3. A camera according to claim 1, wherein said determination circuit determines whether a frame of the cartridge loaded into said camera is a frame having magnetic information recorded in the magnetic recording part, by detecting magnetic information recorded in the magnetic recording part of the corresponding frame.

4. A camera according to claim 1, wherein the information of the frame number is information about a number of exposed frames or a frame number of a leading frame among unexposed frames.

5. A camera into which a cartridge containing a film having a magnetic recording part for each frame of the film is loaded and which, after performing a photographing action on each frame to bring a plurality of frames into an exposed state, causes magnetic recording circuit to record magnetic information in the magnetic recording part of each of the exposed frames, said camera comprising:

a) a film transporting circuit having a first film transport action mode for transporting the film in a first direction and a second film transport action mode for transporting the film in a second direction;

b) a determination circuit for determining whether or not the magnetic information is recorded sequentially in the magnetic recording part of each of frames under the state that the film is being transported in the first direction by the first transport action mode;

c) a memorization portion of memorizing the information of the frame number;

d) a photographing circuit for photographing frames in the order from a loading unexposed frame detected during the film transport in the first direction on the basis of determination results by the determination circuit;

e) a magnetic recording circuit for recording magnetic information in the magnetic recording part of each of frames while the film is being transported in the second direction by the second film transport action mode after each of the frames is Photographed by the photographic circuit; and f) a prohibition circuit for prohibiting the recording by the recording circuit after the recording by the magnetic recording circuit has been performed on a frame corresponding to the frame number information memorized in the memorization portion.

6. A camera according to claim 5, wherein the first direction is a direction to wind the film, and the second direction which is reverse to the first direction is a direction to rewind the film.

7. A camera into which a cartridge containing a film having a magnetic recording part for each frame of the is loaded and which counts a frame number and provides a frame number display every time one frame of the film is transported, said camera comprising:

a) a determination circuit for, when a cartridge containing a film in which part of frames have been exposed and magnetic information has been recorded in the magnetic recording part of each of the exposed frames is loaded into said camera, determining whether a frame is the frame having magnetic information recorded, by detecting magnetic information in the magnetic recording part of each frame every time each frame is transported;

b) a positioning circuit which transports the film in a reverse direction after the frame is determined as not being recorded with the magnetic information by the determination operation as to whether each transported frame is recorded with the magnetic information by the determination circuit to position the frame determined as not being recorded with the magnetic information to the aperture position;

c) a display control circuit which changes the frame numbers in one direction from a predetermined number to the frame positioned to the aperture position until the frame determined as not being recorded with the magnetic information is positioned to the aperture position by the positioning circuit.

8. A camera according to claim 7, wherein said display control means controls, in accordance with the result of determination, an updating action of the frame number display which is performed every time one frame is transported.

9. A camera according to claim 7, wherein said determination circuit determines whether a frame is the frame having magnetic information recorded, by detecting magnetic information in the magnetic recording part of a frame currently located at the aperture position, during a period when the next frame is transported up to the aperture position, wherein said positioning circuit transports the film in a first direction at least until one frame is determined by said determination circuit to have no magnetic information recorded and, after that, transports the film in a direction reverse to the first direction until the frame determined to have no magnetic information recorded comes to the aperture position, and wherein said display control circuit causes the frame number to be updated and displayed when a frame transported is determined to have magnetic information recorded.

10. A camera according to claim 7, wherein said determination circuit determines whether a frame is the frame having magnetic information recorded, by detecting magnetic information in the magnetic recording part of a frame currently located at the aperture position, during a period when the next frame is transported up to the aperture position, wherein said positioning circuit transports the film in a first direction until one frame is determined by said determination circuit to have no magnetic information recorded and, after that, transports the film in a direction reverse to the first direction until the frame determined to have no magnetic information recorded comes to the aperture position, and wherein said display control circuit causes the frame number display to show a frame number which differs by one frame from the frame number of a frame currently located at the aperture position.

11. A camera into which a film cartridge in which a magnetic recording part is provided for each frame of a film is loaded, said camera comprising:

a) a film transport part;

b) a determination circuit which, when the film is transported by said film transport part in a first direction, determines whether or not information has been recorded in the magnetic recording part of each frame, said determination circuit determining whether information has been recorded in the magnetic recording part of a frame located at an aperture position, during a period when the next frame is transported up to the aperture position;

c) a positioning circuit which, when the frame is determined by said determination circuit to have no magnetic information recorded, sets a leading frame among unexposed frames at the aperture position by transporting the film in a direction reverse to the first direction; and d) a frame number display part, said frame number display part changing a state of display indicating a frame number of a frame every time the film is transported by one frame in the first direction, and not changing the state of display when the film is transported in the direction reverse to the first direction.

12. A camera according to claim 11, wherein said frame number display part performs a displaying operation in a state of display indicating a frame number which differs by one frame from a frame number of the frame located at the aperture position, when the film is transported in the first direction.

13. A camera into which a film cartridge in which a magnetic recording part is provided for each frame of a film is loaded, said camera comprising:

a) a film transport part;

b) a determination circuit which, when the film is transported by said film transport part in a first direction, determines whether or not information has been recorded in the magnetic recording part of each frame, said determination circuit determining whether information has been recorded in the magnetic recording part of a frame located at an aperture position, during a period when the next frame is transported up to the aperture position;

c) a positioning circuit which, when the frame is determined by said determination circuit to have no magnetic information recorded, sets a leading frame among unexposed frames at the aperture position by transporting the film by a predetermined number of frames in a direction reverse to the first direction; and d) a frame number display part, said frame number display part changing a state of display indicating a frame number of a frame, when the frame is determined by said determination circuit to have magnetic information recorded, every time the film is transported in the first direction, and not changing the state of display when the frame is determined by said determination circuit to have no magnetic information recorded.

* * * * *

UNITED STATES PATENT AND TRADEMARK OFFICE
CERTIFICATE OF CORRECTION

PATENT NO. : 6,029,016
DATED : February 22, 2000
INVENTOR(S) : Toshiyuki Kumakura It is certified that error appears in the above-identified patent and that said Letters Patent are hereby corrected as shown below:

Col. 11, line 23, after "mode;" insert -- c) a computer portion for providing information of a frame number with respect to a boundary position between an unexposed frame and an exposed frame on the basis of determination results of the determination circuit; --
Col. 11, line 24, delete "c)" and insert -- d) --.
Col. 11, line 27, delete "d)" and insert -- e) --.
Col. 11, line 28, delete "loading" and insert -- leading --.
Col. 11, line 31, delete "e)" and insert -- f) --.
Col. 11, line 35, delete "is Photographed" and insert -- is photographed --.
Col. 11, line 37, delete "f)" and insert -- g) --.

Signed and Sealed this

Seventeenth Day of April, 2001

*Attest:*

NICHOLAS P. GODICI

*Attesting Officer*     Acting Director of the United States Patent and Trademark Office